United States Patent [19]
Hirose et al.

[11] Patent Number: 5,103,091
[45] Date of Patent: Apr. 7, 1992

[54] SCANNING OPTICAL APPARATUS HAVING FOCAL POSITION DEVIATION DETECTING AND CORRECTING CAPABILITY

[75] Inventors: Yoshihiko Hirose, Yokohama; Hitoshi Arai, Kawasaki, both of Japan

[73] Assignee: Canon Kabushiki Kaisha, Tokyo, Japan

[21] Appl. No.: 629,178

[22] Filed: Dec. 20, 1990

Related U.S. Application Data

[63] Continuation of Ser. No. 352,829, May 16, 1989, abandoned.

[30] Foreign Application Priority Data

May 19, 1988 [JP] Japan .................................. 63-123623
May 19, 1988 [JP] Japan .................................. 63-123626

[51] Int. Cl.$^5$ ............................................. H01J 3/14
[52] U.S. Cl. .................................. 250/235; 250/201.4; 358/494; 346/108
[58] Field of Search ............... 250/235, 236, 201.2, 250/201.4; 358/480, 481, 493, 494, 296, 302; 350/6.7, 6.8; 346/108

[56] References Cited

U.S. PATENT DOCUMENTS

| | | | |
|---|---|---|---|
| 4,386,272 | 5/1983 | Check et al. | 250/236 |
| 4,404,596 | 9/1983 | Juergensen et al. | 358/481 |
| 4,441,126 | 4/1984 | Greenig et al. | 358/481 |
| 4,661,699 | 4/1987 | Welmers et al. | 358/494 |
| 4,733,064 | 3/1988 | Ishikawa | 250/201.4 |

FOREIGN PATENT DOCUMENTS

| | | |
|---|---|---|
| 60112020 | 11/1983 | Japan . |
| 59-116603 | 7/1984 | Japan . |
| 60-100111 | 6/1985 | Japan . |
| 60-100113 | 6/1985 | Japan . |
| 61-275868 | 2/1986 | Japan . |
| 61-173233 | 8/1986 | Japan . |
| 2041580 | 9/1980 | United Kingdom . |

Primary Examiner—David C. Nelms
Attorney, Agent, or Firm—Fitzpatrick, Cella, Harper & Scinto

[57] ABSTRACT

A scanning optical apparatus according to the present invention comprises a light source, a modulator for modulating a light flux emitted from the light source, an image forming device for forming an image of the light flux from the light source to a predetermined position, a deflector for deflecting the light flux from the light source in a predetermined position, a photosensitive device for sensing the light flux deflected by the deflector, an adjusting device for adjusting an image forming position of the light flux by the image forming device in correspondence to a signal obtained by the photosensitive device and an inhibiting device when the light flux emitted from the light source is being modulated by the modulator in correspondence to a predetermined signal. By the scanning optical apparatus of the invention, the focal deviation can be always stably corrected and a stable image with high density can be obtained.

28 Claims, 6 Drawing Sheets

SCANNING OPTICAL APPARATUS HAVING FOCAL POSITION DEVIATION DETECTING AND CORRECTING CAPABILITY

This application is a continuation of application Ser. No. 07/352,829 filed May 16, 1989, now abandoned.

BACKGROUND OF THE INVENTION

1. Field of the Invention

The present invention relates to a scanning optical apparatus in which a light flux from a light source is transmitted through a deflector and a lens system and scans on a scanning surface and, more particularly, to a scanning optical apparatus having a function to detect and correct a focal position deviation of an image forming spot of the light flux on the scanning surface which is caused due to an environmental fluctuation of temperature or the like.

2. Related Background Art

In recent, years, as a scanning optical apparatus, there has been wide use of a laser beam printer apparatus in which a laser light source is modulated in accordance with an image signal, a laser beam from the modulated laser light source is periodically deflected by a deflector, the laser beam is focused like a spot onto a photosensitive recording medium as a scanning surface by the lens system, and the light spot is exposed and scanned, thereby recording an image.

However, the conventional laser beam printer apparatus has a drawback such that each of the components constructing the lens system is thermally deformed by a change in environmental temperature, an image forming position of a laser beam on the photosensitive material (scanning surface) is deviated, and the picture quality deteriorates.

As means for solving the above drawback, there has been disclosed a construction in JP-A-60-100111, which provides temperature detecting means to measure a temperature of a collimator lens to collimate a laser beam from a laser light source is arranged near the collimator lens, a signal from the temperature detecting means is compared with a preset reference temperature, and a lens moving apparatus to move the collimator lens in the optical axis direction in accordance with a comparison output. The collimator lens is moved in the non-image region in the scanning line in correspondence to an output signal indicative of the non-image region.

However, in the case of actually constructing the laser beam printer apparatus as disclosed in JP-A-60-100111, there occurs a situation such that the collimator lens is moved by the signal indicative of the non-image region even during the operation in which the laser light source is modulated in accordance with an image signal and an image is recorded onto the photosensitive material (scanning surface). Therefore, there is a drawback such that the size and contrast of the pixel change on different scanning lines during the image forming operation and the output image quality cannot be made uniform.

SUMMARY OF THE INVENTION

It is an object of the present invention to solve the drawbacks of the conventional apparatus as mentioned above and to provide a scanning optical apparatus which can form a stable image.

The above object of the invention is accomplished by a scanning optical apparatus having a focal position adjusting mechanism in which a light flux from a light source is transmitted through a deflector and a lens system and is scanned onto a scanning surface and the image forming position of the light flux on the scanning surface is moved, wherein the operation of the focal position adjusting mechanism is stopped for a period of time when the light source is modulated in accordance with an image signal and an image is formed onto the scanning surface.

BRIEF DESCRIPTION OF THE DRAWINGS

FIGS. 2(a) and 2(b) show signals during the adjusting operation in the embodiment shown in FIG. 1;

DESCRIPTION OF THE PREFERRED EMBODIMENTS

The present invention will be described hereinbelow on the basis of an embodiment shown in the diagrams. In the invention, "for the period of time when a light source is modulated in accordance with an image signal as a predetermined signal and an image is formed onto the scanning surface" denotes the period of time when a light source is modulated in accordance with an image signal as a predetermined signal and an image of a single unit is formed onto the scanning surface. That is, in the case of a laser beam printer apparatus as an example, such a period of time denotes the period of time when a predetermined number of papers corresponding to a single unit of image information is printed out and does not mean the period of time when the light source is not modulated in one scanning line.

Figure 1:
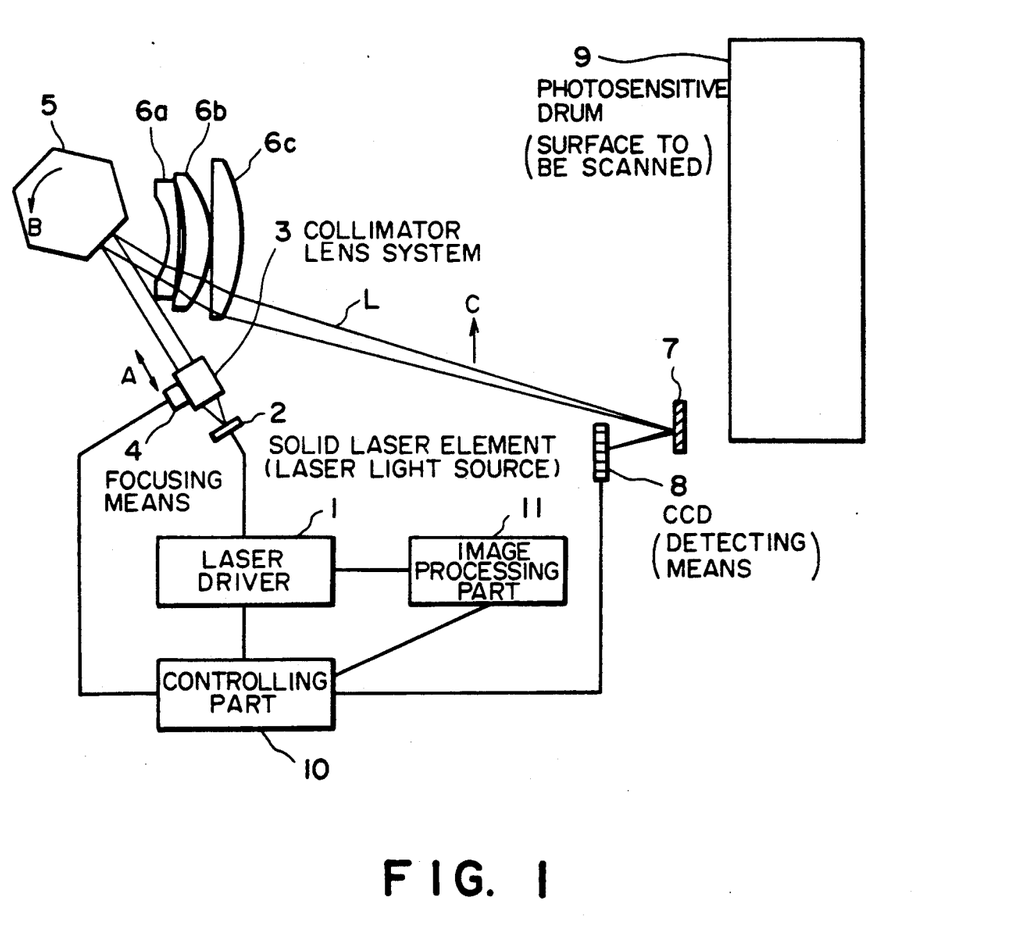
FIG. 1 is a schematic diagram showing an embodiment of a scanning optical apparatus according to the present invention.

FIG. 1 is a diagram showing a schematic construction of the first embodiment of a scanning optical apparatus according to the invention. In the diagram, reference numeral 1 denotes a laser driver as a light emitting signal generator to send a light emitting signal to generate a laser beam. A solid laser element 2 as a laser light source serving as a light source part connected to the laser driver 1 is turned on and off in accordance with the light emitting signal. Reference numeral 3 denotes a collimator lens system to convert a laser beam emitted from the solid laser element 2 into an almost parallel beam. The collimator lens system 3 can be moved by only a predetermined distance in the direction of an arrow A as an optical axis direction of the laser beam by focusing means 4, which will be explained hereinlater. Reference numeral 5 denotes a rotating polyhedron mirror. By rotating the mirror 5 at a predetermined speed in the direction of an arrow B, the mirror 5 reflects the parallel beam transmitted from the collimator lens system 3 and scans in the direction of an arrow C as a predetermined direction. Reference numerals 6a, 6b, and 6c denote a group of fθ lenses arranged in front of the rotating polyhedron mirror 5. The laser beam deflected by the mirror 5 is directed to a predetermined position on the surface to be scanned and the scanning speed is set to a uniform speed on this surface by the fθ lens group. L indicates a laser beam. The laser beam L is led through a reflecting mirror 7 onto a CCD (solid state image pickup device such as a charge coupled device) 8 as detecting means and is also scanned onto a photosensitive drum 9 as a surface to be scanned. A developing device, a primary charging device, a copy transfer charging device, a fixing device, a cleaner, and the like (which are not shown) are arranged around the drum 9. A latent image formed on the surface of the drum 9 is developed and copy transferred onto a copy transfer material by a well-known electrophotographic process. The CCD 8 is constructed by arranging a number of photodetectors in the direction of the arrow C at positions which are substantially optically equivalent for both of the surface of the photosensitive drum 9 and the light source part. The the CCD 8 is connected to a controlling part 10 to control the laser driver and focusing means 4. Reference numeral 11 denotes an image processing part connected to the laser driver 1 and controlling part 10.

In the above construction, in the case of forming a desired image, an image output signal P is first input from the image processing part 11 to the controlling part 10, an image signal S is input to the laser driver 1, and the laser element 2 is turned on and off at a predetermined timing. A laser beam emitted from the solid laser element 2 is converted into the almost parallel beam by the collimator lens system 3. When the rotating polyhedron mirror 5 is further rotated in the direction of the arrow B, the laser beam is scanned in the direction of the arrow C by the mirror 5 and is directed as a spot onto the photosensitive drum 9 by the group of fθ lenses 6a, 6b, and 6c. Due to the scan of the laser beam L as mentioned above, an exposure distribution of one scanning operation of the image is formed on the surface of the drum 9. By further rotating the drum 9 by a predetermined amount every scan, a latent image having the exposure distribution according to the image signal S is formed on the drum 9 and is recorded as a developed image onto a recording paper by the well-known electrophotographic process. The image output signal P is output from the image processing part 11 prior to the image signal S and the output of the signal P is completed after the output of the image signal S was finished. On the other hand, the operation of the controlling part 10 is stopped for the period of time when the image output signal P is input from the image processing part 11. Therefore, the size and contrast of the pixel can be held constant during the image forming operation.

Figure 2A:
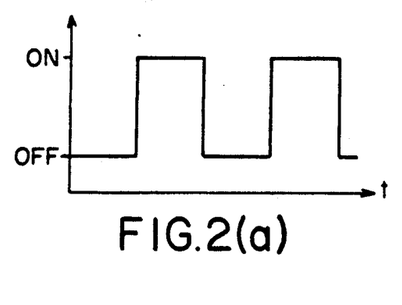
FIG. 2(a) is a graph showing a signal from a laser driver.

The operation of a focal position adjusting mechanism of the laser beam L will now be described. First, an operation signal is input from the controlling part 10 to the laser driver 1. A square wave which turned on and off at every predetermined period as shown in FIG. 2(a) is generated from the laser driver 1 for a predetermined period of time. The solid laser element 2 is turned on and off in accordance with such a square wave signal. The laser beam from the solid laser element 2 is scanned as mentioned above and is also reflected by the reflecting mirror 7 and is projected and scanned onto the CCD 8 arranged at the position which is optically equivalent to the photosensitive drum 9.

Before the laser beam L scans onto the CCD 8, the controlling part 10 resets the accumulated charges of each image in the CCD 8. After the charges were accumulated into each pixel in the CCD 8 by the spot scan of one line, the controlling part 10 reads out the charges as an electric signal.

Figure 2B:
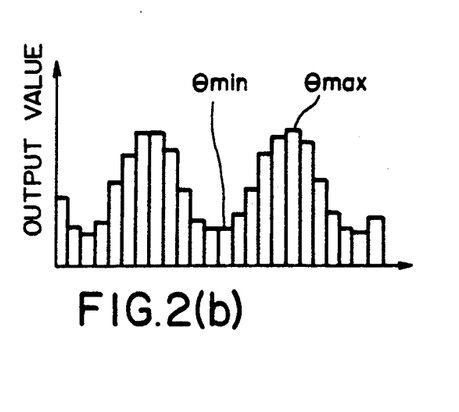
FIG. 2(b) is a graph showing an output signal from a CCD.
Figure 3:
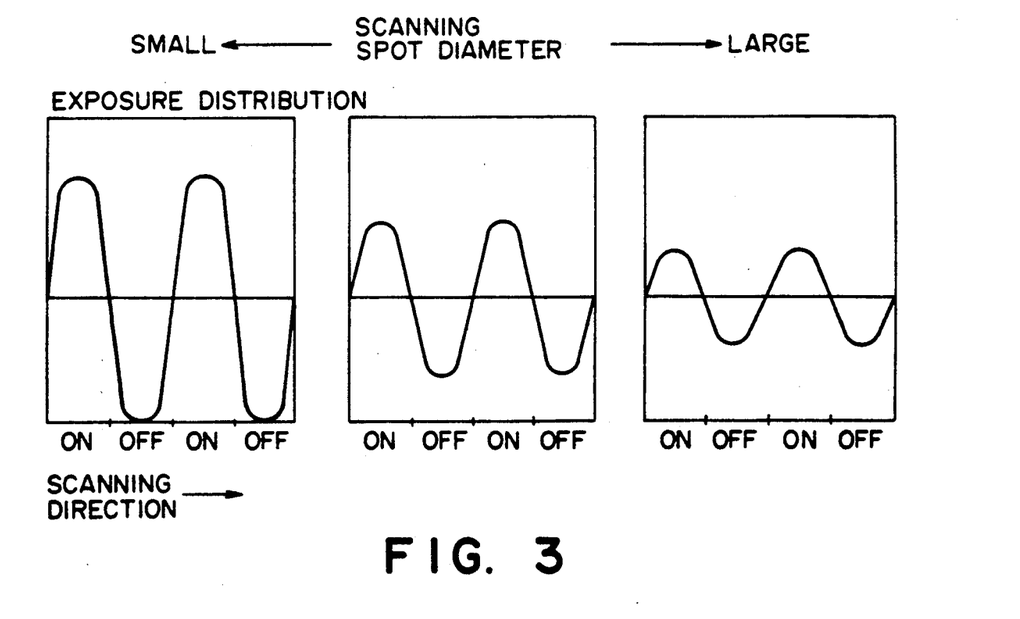
FIG. 3 is a graph showing the relation between the spot diameter of a laser beam and the exposure distribution.

When the laser beam from the laser element 2 is turned on and off and is scanned once, the CCD 8 is located at the position which is optically equivalent to the drum 9. Therefore, the exposure distribution on the surface of the CCD 8 shows a distribution shape of the intensity according to the spot diameter of the laser beam L as shown in FIG. 3. Thus, an output of each pixel of the CCD 8 has a distribution as shown in FIG. 2(b). Such a signal is sent to the controlling part 10. In the controlling part 10, a contrast V is calculated and measured by the equation $$V = \frac{\theta_{max} - \theta_{min}}{\theta_{max} + \theta_{min}} \qquad (1)$$

(where, $\theta_{max}$ is the maximum value of the output of the CCD 8 and $\theta_{min}$ is the minimum value thereof)

In this case, since the contrast V increases as the spot diameter in the scanning direction decreases, a preset value $V_0$ and the value V obtained by the calculation of the equation (1) are compared. When V is not equal to the preset value $V_0$, a drive signal is sent from the controlling part 10 to the focusing means 4, thereby moving the collimator lens system 3 in the direction of the arrow A by a predetermined amount. The contrast V is measured at the position where the collimator lens system 3 was moved and the collimator lens system 3 is fixed at the position where the measured value V is equal to $V_0$. Due to this, the deviation of the focal point of the optical system is corrected and the scanning spot diameter of the laser beam L can be minimized.

Figure 4:
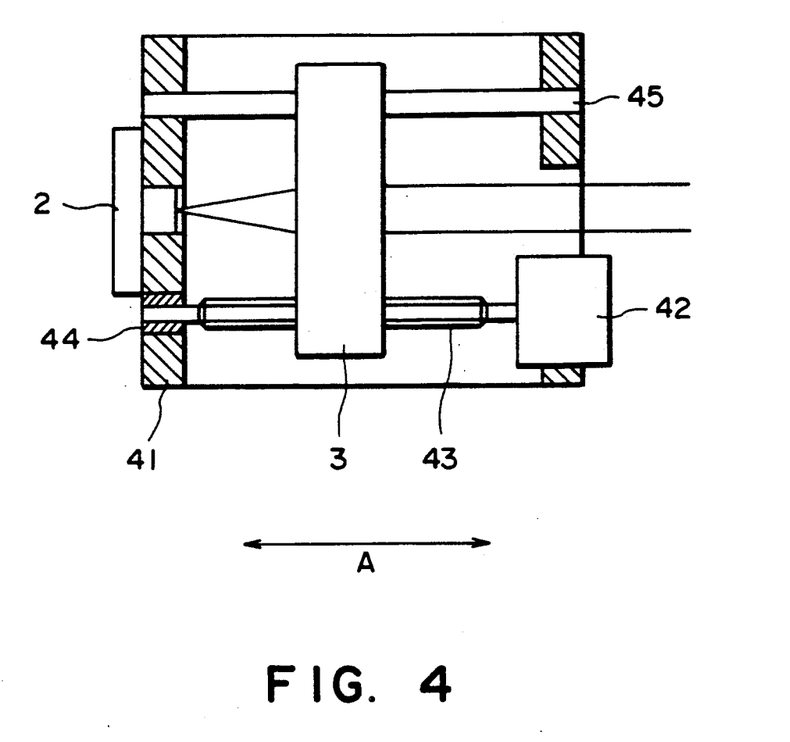
FIG. 4 is an enlarged diagram showing a mechanism to move a collimator lens system to adjust the focal position.

FIG. 4 shows an enlarged diagram of the collimator lens system 3 having the focusing means 4. As shown in the diagram, the solid laser element 2, a stepping motor 42, and a guide shaft 45 are attached to a frame 41. The collimator lens system 3 is supported by the guide shaft 45 and a lead screw 43 which is formed by working the shaft of the stepping motor 42. One end portion of the lead screw 43 is supported by a bearing 44 fixed to the frame 41. On the other hand, a female screw which is threadably fitted to the lead screw 43 is provided for the collimator lens system 3. In addition, a slide bearing is also provided for the lens system 3 so as to be come into slide contact with the guide shaft 45. When the drive signal is input from the controlling part 10, the stepping motor 42 is driven to rotate the lead screw 43. By the rotation of the lead screw 43, the collimator lens system 3 is moved in the direction of the arrow A as the optical axis direction of the laser beam.

As mentioned above, the laser beam L is directed onto the CCD 8 arranged at the position which is optically equivalent to the photosensitive drum 9 and the laser spot diameter is detected and the position of the collimator lens system 3 is adjusted on the basis of the detection signal. Therefore, an increase in laser spot diameter due to the environmental fluctuation of a temperature or the like can be prevented. Thus, a spot of a desired size can be always obtained and the image of a high density and a high quality can be formed.

The operation of the invention will now be described in detail on the basis of a flowchart shown in FIG. 5. It is now assumed that the position at which the spot diameter of the laser beam can be minimized by correcting the deviation of the focal point of the optical system exists at the movable position of the collimator lens system.

First, when the signal to make the focusing mechanism operative is input to the controlling part 10, a microcomputer in the controlling part 10 checks to see if the image output signal P has been output from the image processing part 11 or not. If the image output signal P has been output from the image processing part 11, the operation of the focusing mechanism is not started. If the image output signal P is not output from the image processing part 11, that is, when no image is formed onto the photosensitive drum 9, the operation of the focusing mechanism is started and the laser element is turned on and off. The value of contrast V is obtained from the output of the detector (CCD).

The present contrast value V is compared with a preset contrast value $V_0$. When $V_0$ and V are equal, namely, when the lens system exists at the position where the scanning spot diameter becomes minimum, there is no need to move the image forming position of the laser beam. Therefore, the operation of the focusing mechanism is finished.

When $V_0$ and V are not equal, that is, when the size of scanning spot diameter changes, it is necessary to correct the deviation of the focal point of the scanning spot by moving the lens system. First, a check is made to see if the lens system can be fed or not. If YES, the lens system is fed by one step and the preset contrast value $V_0$ and the present contrast value V are again compared. The above processing sequence is repeated until $V_0$ and V are equal. When they are equal, the movement of the lens system is stopped and the operation of the focusing mechanism is finished. If the lens system has reached the feed end position by the repetition of the above sequence, this means that the moving direction of the lens system is wrong. Therefore, in such a case, the lens system is returned by one step and the preset contrast value $V_0$ and the present contrast value V are again compared. The above sequence is repeated until the values of $V_0$ and V are equal. When they are equal, the movement of the lens system is stopped and the operation of the focusing mechanism is completed.

Figure 5:
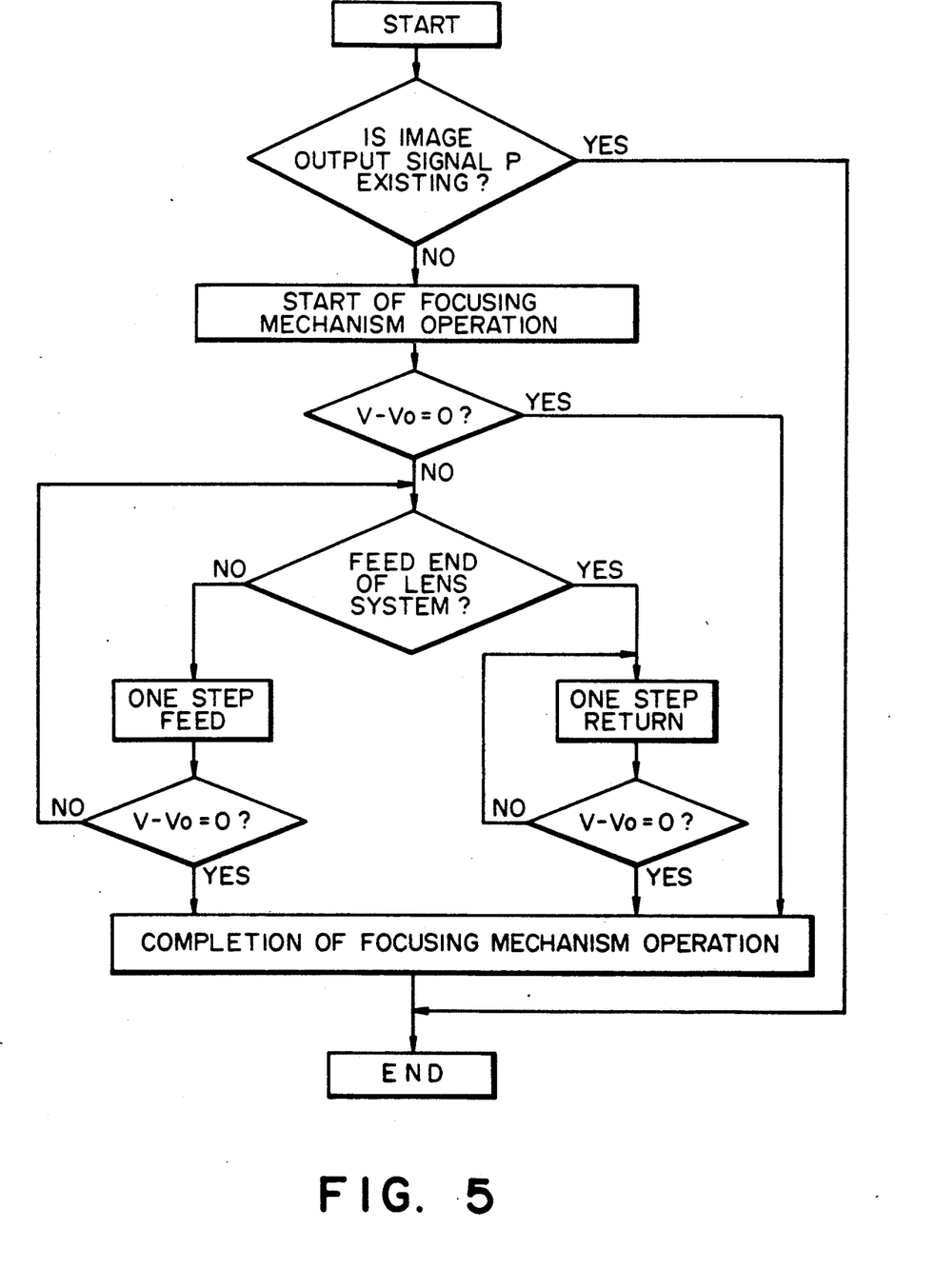
FIGS. 5, 6 to 7 are flowcharts for explaining the operation of the invention.

In the above flowchart shown in FIG. 5, when the moving direction of the lens system to move the focal position is wrong, there is a possibility such that the lens system will have been fed to the feed end position. However, the deviation of the focal position can be promptly corrected by discriminating whether the moving direction of the lens system is correct or wrong by comparing a contrast value A at the start of the operation with a contrast value B after the lens system was fed by one step by using a flowchart shown in FIG. 6.

Figure 6:
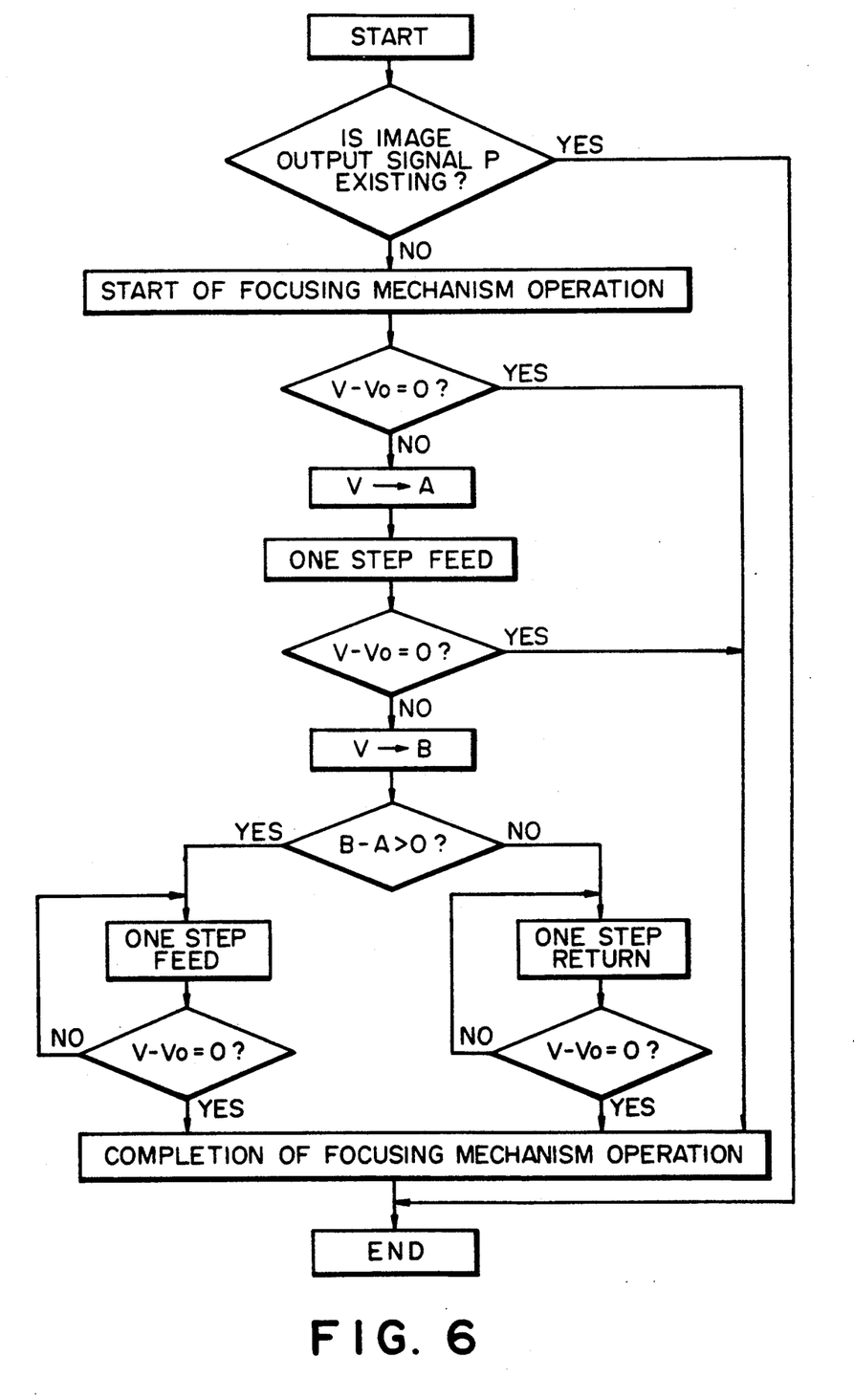

In the examples shown in FIGS. 5 and 6, the processing sequence has been executed such that the preset contrast value $V_0$ and the present contrast value V are equalized. However, it is actually hard to equalize the values $V_0$ and V. The sequence can be also executed so that $|V-V_0|<R$ (R is a predetermined value).

In the examples shown in FIGS. 5 and 6 mentioned above, the operation of the focusing mechanism has been started by checking whether the image output signal P has been output from the image processing part or not. However, in the case where the image output signal P is input to the controlling part 10 from the image processing part 11 during the operation of the focusing mechanism, the operation of the focusing mechanism is soon stopped and the movement of the lens system is stopped and the image formation is executed. It is obviously desirable that the stop position of the lens system is set to the optimum focal position just before the image formation. After completion of the image formation, the operation of the focusing mechanism is restarted and the deviation of the focal position of the laser beam is corrected.

On the other hand, as another system, even in the case where the image output signal P is input from the image processing part 11 to the controlling part 10 during the operation of the focusing mechanism, the operation of the focusing mechanism is not stopped but, on the contrary, a signal indicating that the focusing mechanism is operating is sent from the controlling part 10 to the image processing part 11 and the operation of the image processing part 11 is temporarily stopped. After the operation of the focusing mechanism had been finished and the correction of the deviation of the focal position of the laser beam was finished, the operation of the image processing part 11 is again started and an image is formed. With the above construction, the image of a high density can be formed.

In the examples of FIGS. 5 and 6 mentioned above, the operation of the detecting means for detecting the image forming state of the light flux on the scanning surface is not executed for the period of time when the image signal S is output from the image processing part 11 to the laser driver 1. However, it is not always necessary to use such a construction. Even when the image formation is being executed, the detecting means for detecting the image forming state of the light flux on the scanning surface is made operative and the presence or absence of the deviation of the focal point can be also detected. In such a case, even if the deviation of the focal point is detected during the image formation, the means (for instance, the collimator lens system) for moving the image forming position of the light flux is not made operative, and after completion of the image formation, the means for moving the image forming position of the light flux is made operative, thereby correcting the deviation of the focal point of the light flux.

In the example shown in FIG. 1 mentioned above, as the means for moving the image forming position of the light flux on the scanning surface, the collimator lens system has been moved, and as the means for detecting the image forming state of the light flux on the scanning surface, the detector (CCD) arranged at the position which is optically equivalent to the photosensitive drum has been used. However, other well-known techniques may be also used with respect to the means for moving the image forming position of the light flux and the means for detecting the image forming state of the light flux.

As the means for moving the image forming position of the light flux, there are considered means such that a convex lens arranged between the collimator lens and the rotating polyhedron mirror is moved as disclosed in JP-A-60-100113, means such that a laser light source or an image forming lens is moved as disclosed in JP-A-59-116603, means such that the optical distance between a lens for scanning and the scanning surface is variable as disclosed in JP-A-60-112020, means such that a laser power is variable as disclosed in JP-A-61-275868, and the like. On the other hand, as the means for detecting the image forming state of the light flux, there is also considered a construction as disclosed in JP-A-60-100111 such that means for detecting the temperature of lens is arranged near the lens and the image forming state of the light flux on the photosensitive drum is detected on the basis of a detection signal from the detecting means.

As described above, according to the invention, in the scanning optical apparatus having the focal position moving mechanism to move the image forming position of the light flux on the scanning surface, there is an advantage such that the stable image can be formed by inhibiting the operation of the focal position moving mechanism for the period of time when the light source is modulated in accordance with an image signal and an image is formed onto the scanning surface.

The timing for the operation of the focal position adjusting mechanism can be set by using an intermittent operating method using a timer or the like, a method whereby a sensor to detect an environmental change in temperature, moisture, or the like is provided and the operation is executed when an output value from the sensor is out of a set value, or the like.

However, according to the above methods, there is also considered a case where the focal position adjusting mechanism to move the image forming position of the light flux on the scanning surface must be frequently made operative, so that there is a problem such that a burden is exerted on the focal position adjusting mechanism. To solve such a problem, it is preferable to use the following system.

That is, in a scanning optical apparatus having a focal position adjusting mechanism in which a light flux from a light source is transmitted through a deflector and a lens system and scans onto the scanning surface and the image forming position of the light flux on the scanning surface is moved, the focal position is adjusted by making the focal position adjusting mechanism operative just before the light source is modulated in accordance with the image signal and an image is formed onto the scanning surface, and after completion of the adjustment of the focal position, the light source is modulated in accordance with the image signal and the image is formed onto the scanning surface. The operation of the focal position adjusting mechanism is obviously inhibited for the period of time when the light source is modulated in accordance with the image signal and the image is formed onto the scanning surface. The operation will be described in detail hereinbelow.

In the case of forming a desired image, a start signal F of the operation of the focusing mechanism is first input from the image processing part 11 to the controlling part 10, thereby starting the operation of the focusing mechanism. Since the operation of the focusing mechanism is similar to that in the embodiment described before, its description is omitted here.

After the operation of the focusing mechanism was finished, that is, after the correction of the deviation of the focal point was finished, an end signal G of the operation of the focusing mechanism is input from the controlling part 10 to the image processing part 11.

When the operation end signal G is input to the image processing part 11, the image processing part 11 sends the image signal S to the laser driver 1, thereby turning on and off the solid laser element 2 at a predetermined timing. The laser beam emitted from the solid laser element 2 is converted into the almost parallel beam by the collimator lens system 3 and is further scanned in the direction of the arrow C by the rotating polyhedron mirror 5 which rotates in the direction of the arrow B. Such a beam is also directed like a spot onto the photosensitive drum 9 by the group of $f\theta$ lenses 6a, 6b, and 6c. An exposure distribution of one scanning operation of the image is formed on the surface of the drum 9 by such a scan of the laser beam L. By further rotating the drum 9 by a predetermined amount every scan, a latent image having the exposure distribution according to the image signal S is formed onto the drum 9 and is recorded as a developed image onto a recording paper by the well-known electrophotographic process.

With the construction as described above, since the focal position adjusting mechanism is made operative just before the image formation, the deviation of the focal print can be always stably corrected without exerting a burden on the focal position adjusting mechanism.

The foregoing operation will be described in detail with reference to a flowchart shown in FIG. 7. It is now assumed that the position where the spot diameter of the laser beam can be minimized by correcting the deviation of the focal point of the optical system exists at the movable position of the collimator lens system.

When the image forming operation is first started, the adjusting mechanism operation start signal F is input from the image processing part 11 to the controlling part 10, thereby starting the operation of the focusing mechanism.

The rotating polyhedron mirror 7 is rotated and the laser element is turned on and off. The contrast value V is obtained from the output of the detector (CCD).

The preset contrast value $V_0$ and the present contrast value V are compared. When $V_0$ and V are equal, that is, when the lens system exists at the position where the scanning spot diameter becomes minimum, there is no need to move the image forming position of the laser light flux, so that the operation of the focusing mechanism is finished.

When $V_0$ and V are not equal, namely, when the size of scanning spot diameter changes, it is necessary to correct the focal deviation of the scanning spot by moving the lens system. First, a check is made to see if the lens system can be fed or not. If YES, the lens system is fed by one step and the preset contrast value $V_0$ and the present contrast value V are compared. The above processing sequence is repeated until the values $V_0$ and V are equal. When the values $V_0$ and V are equal, the movement of the lens system is stopped and the operation of the focusing mechanism is finished. If the lens system has reached the feed end position by the repetition of the sequence, this means that the moving direction of the lens system is wrong. Therefore, in such a case, the lens system is returned by one step and the preset contrast value $V_0$ and the present contrast value V are again compared. The above sequence is repeated until the values $V_0$ and V are equal. When they are equal, the movement of the lens system and the turning on/off operations of the laser element are stopped and the operation of the focusing mechanism is finished.

In the above sequence, the sequence has been performed so that the preset contrast value $V_0$ and the present contrast value V are equalized. However, it is actually difficult to control so as to equalize the values $V_0$ and V and the sequence may be also executed so as to satisfy $|V - V_0| < R$ (R is a predetermined value).

After completion of the operation of the focusing mechanism, that is, after completion of the correction of the focal deviation, the focusing mechanism operation end signal G is input from the controlling part 10 to the image processing part 11.

When the image processing part 11 receives the operation end signal G, the image processing part 11 sends the image signal S to the laser driver 1 and the solid laser element 2 is turned on and off at a predetermined timing, thereby forming an image onto the scanning surface.

After completion of the output of the image signal S, the operation of the laser driver 1 and the rotation of the rotating polyhedron mirror 7 are finished and the image forming operation is completed.

Figure 7:
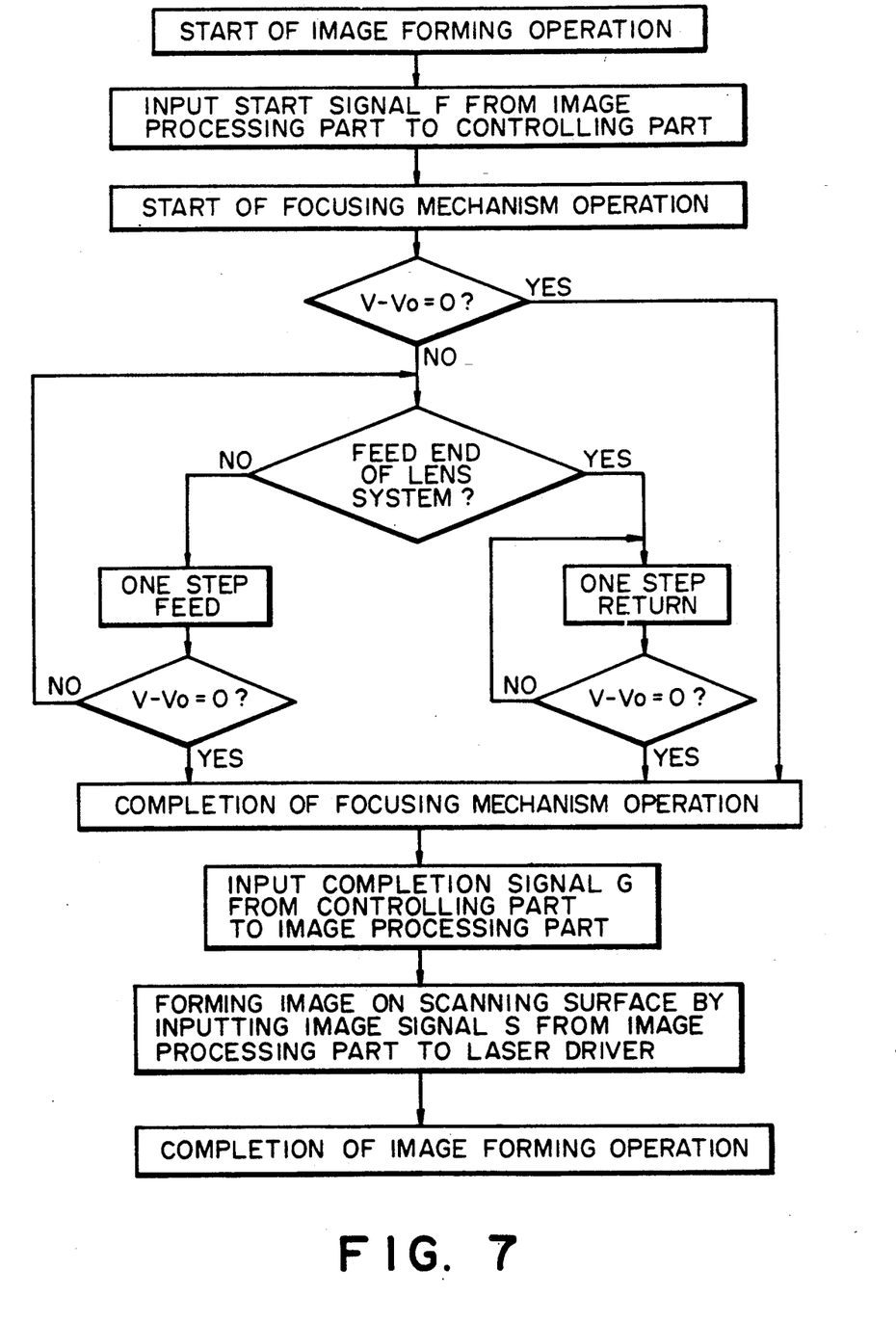

In the flowchart shown in FIG. 7 mentioned above, the contrast value V is obtained from the output of the CCD (detector) immediately after the rotating polyhedron mirror rotates and the solid laser element starts the turning on/off operations. However, after the elapse of a predetermined time after the rotating polyhedron mirror had rotated and the solid laser element started the turning on/off operations, it is desirable to obtain the contrast value V and to start the sequence. That is, this is because the focal deviation can be corrected in a state which is nearer to the actual environmental state during the image formation after the temperature in the apparatus sufficiently rose after the elapse of a predetermined time. The similar effect is also obtained even in the case where a sensor to detect the temperature is provided in the apparatus and after the output of the sensor reaches a predetermined value (value corresponding to the temperature during the image formation), the contrast value V is derived and the sequence is started.

As described above, in the scanning optical apparatus having the focal position adjusting mechanism to move the image forming position of the light flux on the scanning surface, the focal position is adjusted by making the focal position adjusting mechanism operative just before the light source is modulated in accordance with the image signal and an image is formed onto the scanning surface, and after completion of the adjustment of the focal position, the light source is modulated in accordance with the image signal and the image is formed onto the scanning surface. Thus, there are advantages such that (1) the focal deviation can be always stably corrected without exerting a burden on the focal position adjusting mechanism, (2) a stable image of a high density can be always formed since the focal deviation is corrected just before the image formation, and the like.

What is claimed is:

1. A scanning optical apparatus comprising:
   a light source section;
   modulating means for modulating a light flux which is emitted from said light source section;
   image forming means for forming an image of the light flux from the light source section to a predetermined position;
   deflecting means for deflecting the light flux from the light source section in a predetermined direction;
   photo-sensitive means for sensing the light flux deflected by said deflecting means;
   adjusting means for adjusting an image forming position of the light flux by said image forming means in correspondence to a signal obtained by said photosensitive means; and
   inhibiting means for inhibiting the operation of said adjusting means when the light flux emitted from the light source section is being modulated by said modulating means in correspondence to a predetermined signal.

2. An apparatus according to claim 1, wherein said adjusting means includes means for moving a part of the image forming means.

3. An apparatus according to claim 1, wherein said predetermined signal is an image signal.

4. A scanning optical apparatus comprising:
   a light source section;
   modulating means for modulating a light flux emitted from said light source section;
   deflecting means for deflecting the light flux from the light source section in a predetermined direction;
   lens means arranged between the light source section and the deflecting means;
   photosensitive means for sensing the light flux deflected by said deflecting means;
   adjusting means for adjusting the operation of the lens means in correspondence to a signal obtained by said photosensitive means; and
   inhibiting means for inhibiting the operation of the adjusting means when the light flux emitted from the light source section is being modulated by the modulating means in correspondence to a predetermined signal.

5. A scanning optical apparatus comprising:
   a light source section;
   image forming means for forming an image of a light flux from said light source section;
   deflecting means for deflecting the light flux from the light source section in a predetermined direction;
   photosensitive means for sensing the light flux deflected by said deflecting means;
   adjusting means for adjusting an image forming position of the light flux by said image forming means in correspondence to a signal obtained by said photosensitive means;
   modulating means for modulating the light flux emitted from the light source section; and
   control means for controlling said modulating means and said adjusting means, said control means inhibiting the operation of the adjusting means when the light flux emitted from the light source section is being modulated by the modulating means in correspondence to a predetermined signal.

6. A scanning optical apparatus comprising:
   a solid laser element;
   a laser driver connected to said solid laser element;
   an image forming optical system for forming an image of the light flux from the solid laser element to a predetermined position;
   a deflector to deflect the light flux from the solid laser element in a predetermined direction;
   a photodetector to detect the light flux deflected by said deflector;
   an image forming optical system driving section to move a part of the image forming optical system in correspondence to a signal detected by said photodetector; and
   inhibiting means for inhibiting the operation of said image forming optical system driving section when the light flux emitted from the solid laser element is being modulated by said laser driver in correspondence to a predetermined signal.

7. A scanning optical apparatus comprising:

a light source section;

modulating means for modulating a light flux which is emitted from said light source section;

image forming means for forming an image of the light flux from the light source section to a predetermined position;

deflecting means for deflecting the light flux from the light source section in a predetermined direction;

photosensitive means for sensing the light flux deflected by said deflecting means; and adjusting means for adjusting an image forming position of the light flux by said image forming means in correspondence to a signal obtained by said photosensitive means, wherein the image forming position of the light flux is adjusted by making said adjusting means operative just before the light flux emitted from the light source section is modulated by said modulating means in correspondence to a predetermined signal, and after completion of the adjustment of the image forming position, the light flux emitted from the light source section is modulated by said modulating means in correspondence to said predetermined signal.

8. A scanning method in a scanning optical apparatus comprising the steps of:

leading a light flux which is emitted from a light source section to a predetermined position through image forming means and deflecting means;

sensing the led light flux by photosensitive means arranged at a predetermined position;

adjusting an image forming position of the light flux by said image forming means in correspondence to a signal obtained by said photosensitive means; and modulating the light flux emitted from the light source section in correspondence to a predetermined signal after completion of the adjusting of the image forming position and scanning said modulated light flux through said image forming means and said deflecting means.

9. A method according to claim 8, wherein said predetermined signal is an image signal.

10. A laser beam printer apparatus comprising:

a light source section;

image forming means for forming an image of a light flux from the light source section;

deflecting means for deflecting the light flux from the light source section;

a recording medium which receives the light flux deflected by said deflecting means;

detecting means for detecting the light flux deflected by said light deflecting means;

adjusting means for adjusting an image forming position of the light flux by said image forming means in correspondence to detection by said detecting means; and inhibiting means for inhibiting the operation of said adjusting means when the light flux emitted from the light source section is being modulated.

11. An apparatus according to claim 10, wherein said adjusting means includes means for moving a part of the image forming means.

12. An apparatus according to claim 10, wherein said light source section is modulated by an image signal.

13. An apparatus according to claim 12, wherein the light flux emitted from the light source section is modulated in correspondence to said image signal so as to effect recording on said recording medium.

14. A laser beam printer apparatus comprising:

a light source section;

deflecting means for deflecting a light flux from the light source section;

lens means arranged between the light source section and said deflecting means;

a recording medium which receives the light flux deflected by said deflecting means;

detecting means for detecting the light flux deflected by said deflecting means;

adjusting means for adjusting the operation of said lens means in correspondence to detection by said detecting means; and inhibiting means for inhibiting the operation of said adjusting means when the light flux emitted from the light source section is being modulated.

15. A laser beam printer apparatus comprising:

a light source section;

image forming means for forming an image of a light flux from the light source section;

deflecting means for deflecting the light flux from the light source section;

a recording medium which receives the light flux deflected by said deflecting means;

detecting means for detecting the light flux deflected by said deflecting means;

adjusting means for adjusting the operation of said lens means in correspondence to detection by said detecting means;

modulating means for modulating the light flux from the light source section; and control means for controlling said adjusting means and said modulating means, said control means inhibiting the operation of said adjusting means when the light flux emitted from the light source section is being modulated by said modulating means.

16. A laser beam printer apparatus comprising:

a light source section;

driving means for driving the light source section;

image forming optical system for forming an image of a light flux from the light source section;

deflecting means for deflecting the light flux from the light source section;

a recording medium which receives the light flux deflected by said deflecting means;

light receiving means for receiving the light flux deflected by said deflecting means;

a driving section for moving a part of said image forming optical system in correspondence to a signal from said light receiving means; and inhibiting means for inhibiting the operation of said driving section when the light flux emitted from the light source section is being modulated by said driving means.

17. A laser beam printer apparatus comprising:

a light source section;

image forming means for forming an image of a light flux from the light source section;

deflecting means for deflecting the light flux from the light source section;

a recording medium which receives the light flux deflected by said deflecting means;

detecting means for detecting the light flux deflected by said deflecting means; and adjusting means for adjusting an image forming position of the light flux by said image forming means in correspondence to detection by said detecting means;

wherein said adjusting means is actuated to adjust the image forming position of the light flux prior to modulation of the light flux emitted from the light source section, and the light flux emitted from the light source section is modulated after adjustment of the image forming position has been completed.

18. A laser beam printer apparatus comprising:

a light source section;

image forming means for forming an image of a light flux from the light source section;

deflecting means for deflecting the light flux from the light source section;

a recording medium which receives the light flux deflected by said deflecting means;

detecting means for detecting the light flux deflected by said deflecting means;

adjusting means for adjusting an image forming position of the light flux by said image forming means in correspondence to detection by said detecting means; and inhibiting means for inhibiting the operation of said adjusting means in correspondence to a recording operation to said recording medium.

19. A laser beam printer apparatus comprising:

a light source section;

driving means for driving the light source section;

image forming optical system for forming an image of a light flux from the light source section;

deflecting means for deflecting the light flux from the light source section;

a recording medium which receives the light flux deflected by said deflecting means;

light receiving means for receiving the light flux deflected by said deflecting means;

a driving section for moving a part of said image forming optical system in correspondence to a signal from said light receiving means; and inhibiting means for inhibiting the operation of said driving section in correspondence to a recording operation to said recording medium.

20. A scanning optical apparatus comprising:

a light source section;

image forming means for forming an image of a light flux from the light source section;

deflecting means for deflecting the light flux deflected by said deflecting means;

detecting means for detecting the light flux deflected by said deflecting means;

adjusting means for adjusting an image forming position of the light flux by said image forming means in correspondence to detection by said detecting means; and inhibiting means for inhibiting the operation of said adjusting means in response to a predetermined signal.

21. A scanning optical apparatus comprising:

a light source section;

image forming means for forming an image of a light flux from the light source section;

deflecting means for deflecting the light flux from the light source section;

detecting means for detecting the light flux deflected by said deflecting means;

adjusting means for adjusting an image forming position of the light flux by said image forming means in correspondence to detection by said detecting means; and inhibiting means for inhibiting the operation of said adjusting means when a predetermined signal is present.

22. A scanning optical apparatus comprising:

a light source section;

deflecting means for deflecting a light flux from the light source section;

lens means arranged between the light source section and said deflecting means;

detecting means for detecting the light flux deflected by said deflecting means;

adjusting means for adjusting the operation of said lens means in correspondence to detection by said detecting means; and inhibiting means for inhibiting the operation of said adjusting means in response to a predetermined signal.

23. A scanning optical apparatus comprising:

a light source section;

deflecting means for deflecting a light flux from the light source section;

lens means arranged between the light source section and said deflecting means;

detecting means for detecting the light flux deflected by said deflecting means;

adjusting means for adjusting the operation of said lens means in correspondence to detection by said detecting means; and inhibiting means for inhibiting the operation of said adjusting means when a predetermined signal is present.

24. A scanning optical apparatus comprising:

a light source section;

image forming means for forming an image of a light flux from the light source section;

deflecting means for deflecting the light flux from the light source section;

detecting means for detecting the light flux deflected by said deflecting means;

adjusting means for adjusting an image forming position of the light flux by said image forming means in correspondence to detection by said detecting means; and a control section for receiving a predetermined signal, said control section inhibiting the operation of said adjusting means when said predetermined signal is received.

25. A scanning optical apparatus comprising:

a light source section;

deflecting means for deflecting a light flux from the light source section;

lens means arranged between the light source section and said deflecting means;

detecting means for detecting the light flux deflected by said deflecting means;

adjusting means for adjusting the operation of said lens means in correspondence to detection by said detecting means; and a control section for receiving a predetermined signal, said control section inhibiting the operation of said adjusting means when said predetermined signal is received.

26. A method of scanning in a laser beam printer apparatus, comprising the steps of:

guiding a light flux emitted from a light source section to a predetermined position using image forming means and deflecting means;

receiving the guided light flux by light receiving means arranged in a predetermined position;

adjusting an image forming position of the light flux by the image forming means in correspondence to a signal from the light receiving means; and modulating the light flux emitted from the light source section after adjusting step, and scanning a recording medium with the modulated light flux using the image forming means and the deflecting means.

27. A method according to claim 26, wherein the light flux is modulated by an image signal.

28. A method of scanning in a scanning optical apparatus, comprising the steps of:

guiding a light flux emitted from a light source section to a predetermined position using image forming means and deflecting means;

receiving the guided light flux by light receiving means arranged in a predetermined position;

adjusting an image forming position of the light flux by the image forming means in corresponded to a signal from the light receiving means; and inhibiting said adjusting step in correspondence to a predetermined signal.

* * * * *